(12) United States Patent
Spieth

(10) Patent No.: US 10,428,791 B2
(45) Date of Patent: Oct. 1, 2019

(54) WIND TURBINE ROTOR BLADE

(71) Applicant: WOBBEN PROPERTIES GMBH, Aurich (DE)

(72) Inventor: Falk Spieth, Aurich (DE)

(73) Assignee: Wobben Properties GmbH, Aurich (DE)

( * ) Notice: Subject to any disclaimer, the term of this patent is extended or adjusted under 35 U.S.C. 154(b) by 207 days.

(21) Appl. No.: 15/515,548

(22) PCT Filed: Oct. 7, 2015

(86) PCT No.: PCT/EP2015/073095
§ 371 (c)(1),
(2) Date: Mar. 29, 2017

(87) PCT Pub. No.: WO2016/055502
PCT Pub. Date: Apr. 14, 2016

(65) Prior Publication Data
US 2017/0234297 A1   Aug. 17, 2017

(30) Foreign Application Priority Data
Oct. 7, 2014  (DE) .................. 10 2014 220 249

(51) Int. Cl.
*F03D 1/06* (2006.01)
(52) U.S. Cl.
CPC ........ *F03D 1/0675* (2013.01); *F05B 2230/60* (2013.01); *F05B 2240/302* (2013.01); *F05B 2260/301* (2013.01); *F05B 2280/6003* (2013.01); *Y02E 10/721* (2013.01); *Y02P 70/523* (2015.11)

(58) Field of Classification Search
CPC ............ F03D 1/0675; F05B 2280/6003; F05B 2240/302; F05B 2230/60; F05B 2260/301; Y02P 70/523; Y02E 10/721
USPC ........................................................ 416/230
See application file for complete search history.

(56) References Cited

U.S. PATENT DOCUMENTS

| 4,990,205 A | 2/1991 | Barbier et al. |
| 5,383,767 A | 1/1995 | Aubry |
| 5,906,746 A | 5/1999 | Arlton |

(Continued)

FOREIGN PATENT DOCUMENTS

| CN | 102011711 A | 4/2011 |
| CN | 103470456 A | 12/2013 |

(Continued)

*Primary Examiner* — Hai H Huynh
(74) *Attorney, Agent, or Firm* — Seed Intellectual Property Law Group LLP

(57) ABSTRACT

A rotor blade of a wind turbine. The rotor blade comprises at least one rotor-blade inner portion, having a region connecting to the rotor-blade hub, and at least one rotor-blade outer portion, having a rotor-blade tip, the rotor-blade inner portion and the rotor-blade outer portion each being made substantially of a fibre-reinforced plastic, and the rotor-blade inner portion and the rotor-blade outer portion being connected to each other by a connecting device. The connecting device in this case comprises an inner insert that is at least partially wrapped in the fibre-reinforced plastic of the rotor-blade inner portion, an outer insert that is at least partially incorporated in the fibre-reinforced plastic of the rotor-blade outer portion, the inner insert and the outer insert being connected to each other via a connecting element.

11 Claims, 2 Drawing Sheets

(56) References Cited

U.S. PATENT DOCUMENTS

| | | |
|---|---|---|
| 7,722,328 B2 | 5/2010 | Wobben |
| 7,994,650 B2 | 8/2011 | Stommel |
| 8,172,539 B2 | 5/2012 | Kootstra |
| 8,245,400 B2 | 8/2012 | Stam et al. |
| 2010/0260612 A1 | 10/2010 | Vasudeva et al. |
| 2011/0293432 A1 | 12/2011 | Hibbard et al. |
| 2011/0299995 A1 | 12/2011 | Kootstra |
| 2012/0055020 A1 | 3/2012 | Stam et al. |

FOREIGN PATENT DOCUMENTS

| | | |
|---|---|---|
| DE | 3879287 T2 | 9/1993 |
| DE | 69307856 T2 | 7/1997 |
| DE | 69534767 T2 | 10/2006 |
| DE | 102010039778 A1 | 3/2012 |
| DE | 102013205965 A1 | 10/2014 |
| EP | 2031245 A2 | 3/2009 |
| EP | 2735732 A2 | 5/2014 |
| JP | 2006-526107 A | 11/2006 |
| JP | 51-13478 U | 1/2013 |
| KR | 10-0736154 B1 | 7/2007 |
| WO | 2011070137 A1 | 6/2011 |

WIND TURBINE ROTOR BLADE

BACKGROUND

Technical Field

The present invention relates to a wind turbine rotor blade, to a connecting device for connecting a rotor-blade inner portion to a rotor-blade outer portion of such a rotor blade, and to a wind turbine. The present invention additionally relates to a method for connecting a first rotor-blade portion to a second rotor-blade portion.

Description of the Related Art

Wind turbines are known in general and are designed, for example, as in FIG. 1. In particular, the size of the rotor blade, or blades, is an important aspect for the efficiency of a wind turbine. In order then to achieve a sufficiently high wind turbine efficiency even in the case of light winds, wind turbines nowadays have increasingly larger rotor diameters, and thus also longer rotor blades. Such a rotor blade, for example, has a length of 40 m or more. With such sizes, it is proving increasingly difficult to manufacture these rotor blades, transport them to the installation site and mount them on the rotor hub of the wind turbine at the installation site. In order to avoid these problems, rotor blades that have a divided rotor blade are already known. The rotor blade in this case is sub-divided, at least in the rotor-blade longitudinal axis, into two parts, namely, into an inner part, the rotor-blade inner portion, which is attached to the rotor-blade hub, and into an outer part, the rotor-blade outer portion, which has a rotor-blade tip.

Such rotor blades, divided in the direction of the rotor-blade longitudinal axis, have connecting devices for connecting the rotor-blade inner portion to the rotor-blade outer portion. The connecting devices in this case are provided at projecting webs or similar. As a result of this, a force acting at the individual rotor-blade portions is deflected into the projecting webs, such that there are unfavorable force conditions acting at the connecting point. These unfavorable force conditions cause local bending moments, which may result in damage at or to the connecting point. Moreover, such connecting devices are usually attached to the rotor blades following the manufacture of the individual rotor-blade portions, such that, in order to attach the connecting device in the respective rotor-blade portion, it is necessary for material to be removed from the rotor blade. Frequently in such cases, to enable precise work to be performed, expensive machines or appliances are required. Moreover, the retroactive fitting of the connecting devices often requires a large amount of time, with the result that the erection of the entire wind turbine is delayed. Thus, the connections known hitherto prove to be expensive and time-consuming.

In the German patent application establishing priority, the following documents were searched by the German Patent and Trademark Office: EP 2 735 732 A2; DE 10 2013 205 965 A1; DE 38 79 287 T2; DE 10 2010 039 778 A1; EP 2 031 245 A2; DE 693 078 56 T2 and DE 695 347 67 T2.

BRIEF SUMMARY

A solution is proposed that further improves, in particular stabilizes, the connection of two rotor-blade portions of a rotor blade of a wind turbine, while at the same time saving time in the erection of the wind turbine. At least, an alternative solution is to be created.

The rotor blade comprises at least one rotor-blade inner portion, having a region connecting to the rotor-blade hub, and at least one rotor-blade outer portion, having a rotor-blade tip. The rotor-blade inner portion and the rotor-blade outer portion in this case are each made substantially of a fiber-reinforced plastic, and the rotor-blade inner portion and the rotor-blade outer portion are connected to each other by at least one connecting device. The at least one connecting device in this case comprises an inner insert that is at least partially wrapped in the fiber-reinforced plastic of the rotor-blade inner portion, and an outer insert that is at least partially incorporated in the fiber-reinforced plastic of the rotor-blade outer portion. The inner insert and the outer insert in this case are connected to each other via at least one connecting element.

The inner insert has an inner contact face, and the outer insert has an outer contact face, which are arranged parallelwise in relation to each other and form a plane that is at an angle $\alpha$ of <90° in relation to the rotor-blade longitudinal axis.

The rotor-blade inner portion and/or rotor-blade outer portion in this case are made, in particular, of a glass-fiber reinforced plastic and/or carbon-fiber reinforced plastic. The rotor-blade inner portion and/or rotor-blade outer portion in this case is made, in particular, by a wrapping process or a vacuum infusion process. In particular, the connecting device is integrated, i.e., incorporated, wrapped-in, infused-in or laminated-in during the process of manufacturing the respective rotor-blade portion, i.e., of the rotor-blade inner portion and the rotor-blade outer portion. Accordingly, the inner insert is part of the rotor-blade inner portion, and the outer insert is part of the rotor-blade outer portion. The at least one connecting element in this case is inserted separately into the outer insert or inner insert. Accordingly, the at least one connecting element is not part of the rotor-blade inner portion and/or rotor-blade outer portion. The at least one connecting element makes the connection between the inner insert and the outer insert, and consequently between the rotor-blade inner portion and the rotor-blade outer portion. After having been connected, the inner insert and the outer insert lie against each other such that the force acting at the connecting region is routed directly from the inner insert into the outer insert, or vice versa. Advantageously, only a slight deflection of force, or almost no deflection of force, occurs in the connecting region. Local bending movements are thus reduced, or even avoided. Damage in the connecting region is thus likewise avoided. Moreover, an automated wrapping process for differing wind turbines makes it possible to manufacture differing rotor blades, having an inner insert and outer insert matched to the geometry of the rotor blade, that can withstand the differently acting loads. The manufacture of such a rotor blade is also less time-consuming.

In particular, the inner insert is at least partially wrapped in the fiber-reinforced plastic of the rotor-blade inner portion. In particular, the rotor-blade inner portion is produced by means of a wrapping process, in particular an automated wrapping process. In this, fibers are wrapped around a body, or core, which gives the rotor-blade inner portion its subsequent shape. The inner insert in this case is arranged at a predefined position and wrapped with the fibers. The fibers in this case are positioned so as to lie closely next to each other in a taut manner and with a high dimensional accuracy, such that the rotor-blade inner portion is of good quality and has a long service life. Accordingly, it is no longer necessary for a connecting device to be attached retroactively by material-removing machining.

In a preferred embodiment, the outer insert is at least partially laminated into the fiber-reinforced plastic of the rotor blade outer portion, in particular laminated-in by means of a vacuum infusion process. The vacuum infusion process makes it possible to achieve a high quality for the rotor-blade inner portion, as well as good reproducibility, owing to the fact that the fibers are impregnated virtually without bubbles.

Preferably, the at least one connecting element extends through a through-hole provided in the inner insert, and can be fastened in a blind hole provided in the outer insert. The at least one connecting element in this case is realized, in particular, as a screw or bolt having a thread, or similar. In particular, a plurality of inner and outer inserts are provided over the circumference of the rotor blade, in the connecting region. The number of inner inserts in this case corresponds to the number of outer inserts. In this case, a connecting element, or a plurality of connecting elements, is/are provided in the respective inner insert and/or outer insert. Alternatively, an inner insert and an outer insert are arranged in the rotor-blade inner portion and rotor-blade outer portion, respectively. The inner insert and the outer insert in this case are connected to a plurality of connecting elements, in particular to more than one hundred connecting elements. In particular, an internal thread is provided in the blind hole, and the connecting element is screwed into the internal thread and can thereby be fastened to the outer insert. The rotor-blade outer portion and the rotor-blade inner portion are held together by the screwed connection.

Such a comparatively simple construction can be realized in that the outer insert and the inner insert are at least partially wrapped in the rotor-blade outer portion and rotor-blade inner portion, respectively, and are thus securely fastened in the rotor-blade outer portion and rotor-blade inner portion, respectively. The region in which the connecting element is arranged is, at least partially, not wrapped-in. At least the region in which the connecting element is inserted remains accessible, such that it is possible to replace the connecting element. This simplifies repair work on the rotor blade, in particular in the connecting region. Alternatively, the blind hole is provided in the inner insert and the through-hole is provided in the outer insert.

In a preferred embodiment, the inner insert and/or the outer insert are/is made of a cast material and/or of a metal. Since the rotor-blade inner portion and the rotor-blade outer portion are made substantially of fiber-reinforced plastics, it is possible to realize rotor blades of a complex structure with, at the same time, a lightweight construction. If only the force transmission elements, i.e., the inner insert and the outer insert, are made of a cast material, in particular of cast iron or cast steel, the advantages resulting from the method of construction with fiber-reinforced plastics can continue to be exploited with, at the same time, comparatively simple construction of the connecting region.

Moreover, prevailing in such a connecting region is a multi-axial stress state, which results from various stresses, such as longitudinal, transverse and shear stresses. In addition, metals have an isotropic material behavior. Accordingly, the properties of the outer insert and inner insert are non-directional. This is particularly advantageous in the case of the prevailing multi-axial stress state. Fiber-reinforced plastics, by contrast, have an orthotropic material behavior. Accordingly, the properties are directional. Realizing an optimum structure of the fiber-reinforced plastic at this location would therefore be extremely labor-intensive and complicated.

Furthermore, materials such as cast iron or steel are more easily subjected to further processing than are fibrous composite materials. In particular, in the case of drilled holes in fibrous composite materials, there is the risk of the material becoming damaged. Moreover, drilled holes of poor quality may be produced, which require labor-intensive manual reworking. The corresponding drilled holes can thus be provided in the inner insert and outer insert made of metal and/or cast materials, without encountering the stated problems in the process. Labor-intensive reworking is thus avoided.

In a particularly preferred embodiment, the inner insert has a wrap portion, which is completely wrapped in the rotor-blade inner portion, and a connecting inner portion that, together with the wrap portion, constitutes the inner insert, and in which the connecting element is accommodated. Accordingly, in particular, the wrap portion and the connecting inner portion are realized as a single piece. In particular, the wrap portion and the connecting inner portion have differing geometries. The differing designs of the wrap portion and of the connecting inner portion are matched, accordingly, to the respective function of the wrap portion and connecting inner portion, respectively. The wrap portion in this case is provided for fastening into the rotor-blade inner portion. The connecting inner portion is provided to receive the connecting element and to connect the inner insert and the outer insert, and thus to transfer the load occurring in the rotor blade. The wrap portion in this case, in particular, is of an elongate form, and arranged in the direction of a rotor-blade longitudinal axis. Owing to the elongate form and the arrangement in the direction of the rotor-blade longitudinal axis, a sufficiently large region is wrapped in the fiber-reinforced plastic of the rotor-blade inner portion, such that the inner insert is arranged in a stable manner in the rotor-blade inner portion.

In the case of a single inner insert that extends over the circumference of the rotor-blade inner portion, the connecting inner portion is realized, in particular, in the shape of a ring, and is partially wrapped in the rotor-blade inner portion. Owing to the ring-shaped embodiment, the fiber-reinforced plastic is not damaged during wrapping. Accordingly, there is no interference with the material properties. Upon connection of the rotor-blade portions, the connecting inner portion of the rotor-blade inner portion and a correspondingly realized part of the rotor-blade outer portion bear against each other. The connecting inner portion in this case has a greater material strength than the wrap portion. As a result, the connecting inner portion is particularly well suited to absorbing the forces occurring at the connecting region of the rotor-blade inner portion and rotor-blade outer portion. In particular, in this case the access to the connecting element is not wrapped in the rotor-blade inner portion. As a result, the connecting element can still be replaced, even after the rotor-blade inner portion has been assembled with the rotor-blade outer portion. Preferably, a first interior space is provided inside the rotor-blade inner portion, and a second interior space is provided inside the rotor-blade outer portion, and the connecting inner portion and connecting outer portion are arranged, at least partially, in the first and the second interior space, respectively, in particular the connecting element is arranged in the first and the second interior space, respectively, in such a manner that the connecting element can be replaced. Since the connecting inner portion and/or connecting outer portion project/projects into the first interior space and second interior space, respectively, it is accessible, and consequently the connecting element arranged therein can be replaced. Accordingly, the connecting inner portion and/or connecting outer portion are/is arranged, at least partially, inside the rotor-blade inner portion and inside the rotor-blade outer portion, respectively.

In part, the connecting inner portion and/or connecting outer portion can be arranged in the rotor-blade inner portion and rotor-blade outer portion, respectively. As a result, the flow around the rotor blade, or the aerodynamic behavior of the rotor blade, is not affected by the connecting device. Moreover, the connecting device is protected against external influences. The connecting element is easy to replace.

In a preferred embodiment, the outer insert has a lamination portion, which is completely laminated into the rotor-blade outer portion, and a connecting outer portion that, together with the lamination portion, constitutes the outer insert, and in which the connecting element is accommodated. As a result, the outer insert is fastened in the rotor-blade outer portion substantially by means of the lamination portion. In particular, the lamination portion is similar, or almost identical, in design to the wrap portion of the rotor-blade inner portion, namely, elongate and arranged in the direction of the rotor-blade longitudinal axis. In particular, in this case the lamination portion and the connecting outer portion are realized as a single piece. Accordingly, the lamination portion is completely incorporated in the rotor-blade outer portion, and thus fastens the outer insert in the rotor-blade outer portion. The connecting outer portion absorbs the forces occurring at the connecting region. In the case of an outer insert that extends over the entire circumference of the rotor-blade outer portion, the connecting outer portion in this case is realized, in particular, in the shape of a ring. In an alternative embodiment, namely, if there are a plurality of inner and outer inserts distributed over the circumference of the blade inner portion and of the blade outer portion, respectively, the connecting inner portion and/or the connecting outer portion are/is realized, in particular, in the shape of a cylinder.

In a preferred embodiment, the connecting inner portion has an inner contact face, and the connecting outer portion has an outer contact face, and the inner contact face and the outer contact face are arranged parallelwise in relation to each other. As a result of the inner and the outer contact face being arranged parallelwise in relation to each other, they bear exactly on each other upon connection of the rotor-blade inner portion and the rotor-blade outer portion. In particular, in this case the through-hole in the rotor-blade inner portion and the blind hole in the rotor-blade outer portion overlap one another exactly, such that the connecting element can be inserted without difficulty through the through-hole, into the blind hole. As a result, a stable connection is made. The inner and the outer contact face in this case are arranged, in particular, at an angle deviating from the rotor-blade longitudinal axis, in particular at an angle of between 30° and <90° (or between 30° and 80° or between 30° and 50°) in relation to the rotor-blade longitudinal axis. Since the inner and the outer contact face form a plane that is at an angle $\alpha$ in relation to the rotor-blade longitudinal axis, there is also a longitudinal axis of the connecting element arranged at an angle $\beta$ (e.g., <60°, e.g., between 10° and 45° or between 40° and 60°) in relation to the rotor-blade longitudinal axis. The longitudinal axis of the connecting element is perpendicular to the plane of the contact faces. In particular, the free end of the connecting element faces towards an interior space of the rotor blade, such that the connecting elements can be serviced, or replaced, from the interior space of the rotor blade.

Selection of the angle $\alpha$ also at the same time affects the angle $\beta$. The angle $\beta$ determines whether, and to what extent, the free end of the connecting element projects into the interior space of the rotor blade.

In a particularly preferred embodiment, there is an expansion sleeve arranged between the through-hole and the connecting element. The expansion sleeve extends the clamping length of the connecting element. The additional load exerted upon the screw is thereby reduced. Upon the occurrence of slight material fatigue phenomena, for example if the material of the rotor-blade inner portion and/or of the rotor-blade outer portion yields somewhat, such an expansion sleeve counteracts the material fatigue. Material fatigue phenomena are thus reduced.

Additionally proposed to achieve the object is a connecting device for connecting a rotor-blade inner portion to a rotor-blade outer portion of a rotor blade according to any one of the embodiments described above. The rotor blade comprises an outer insert that is to be at least partially wrapped in the rotor-blade outer portion, an inner insert that is to be at least partially laminated into the rotor-blade inner portion, and a connecting element that extends through the inner insert and that is to be fastened in the outer insert. There thus ensue the relationships, explanations and advantages according to at least one embodiment of the described rotor blade.

Also proposed is a wind turbine, having at least one rotor blade according to at least one of the previously described embodiments, having a connecting device, preferably having three rotor blades according to at least one of the previously described embodiments, having a connecting device. There thus ensue the relationships, explanations and advantages according to at least one embodiment of the described rotor blade.

Additionally proposed is a method for connecting a rotor-blade inner portion to a rotor-blade outer portion of a rotor blade of a wind turbine according to any one of the previously described embodiments. The method comprises the steps: providing an outer insert, an inner insert and at least one connecting element, at least partially laminating the outer insert into the rotor-blade outer portion, and at least partially wrapping the inner insert in the rotor-blade inner portion. Furthermore, the method comprises the step of connecting the rotor-blade inner portion to the rotor-blade outer portion by inserting the connecting element in the outer insert, via the inner insert, and fastening it in the outer insert. The wrapping of the inner insert and outer insert in the rotor-blade inner portion and rotor-blade outer portion, respectively, avoids labor-intensive retroactive fitting of a connecting device in the respective rotor-blade portions. Alternatively, the outer insert may also be wrapped in the rotor-blade inner portion, and the inner insert also wrapped in the rotor-blade outer portion.

BRIEF DESCRIPTION OF THE SEVERAL VIEWS OF THE DRAWINGS

The invention is explained exemplarily in greater detail in the following on the basis of an exemplary embodiment, with reference to the accompanying figure.

DETAILED DESCRIPTION

The explanations of the invention on the basis of examples and with reference to the figure are substantially schematic, and the elements explained in the figure may be exaggerated therein, and other elements simplified, to aid illustration.

Figure 1:
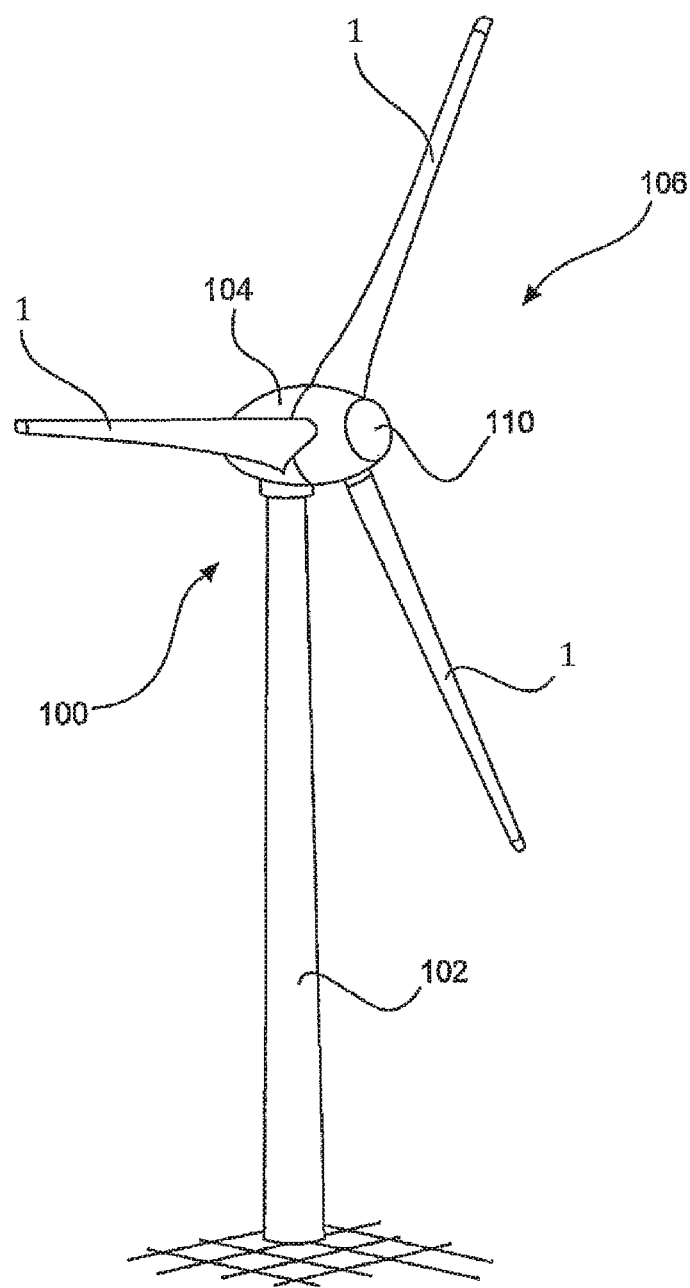
FIG. 1 shows a wind turbine, in a schematic, perspective view.

FIG. 1 shows a wind turbine 100, having a tower 102 and a nacelle 104. A rotor 106, having three rotor blades 1 and a spinner 110, is arranged on the nacelle 104. When in operation, the rotor 106 is put into a rotary motion by the wind, and thereby drives a generator in the nacelle 104.

Figure 2:
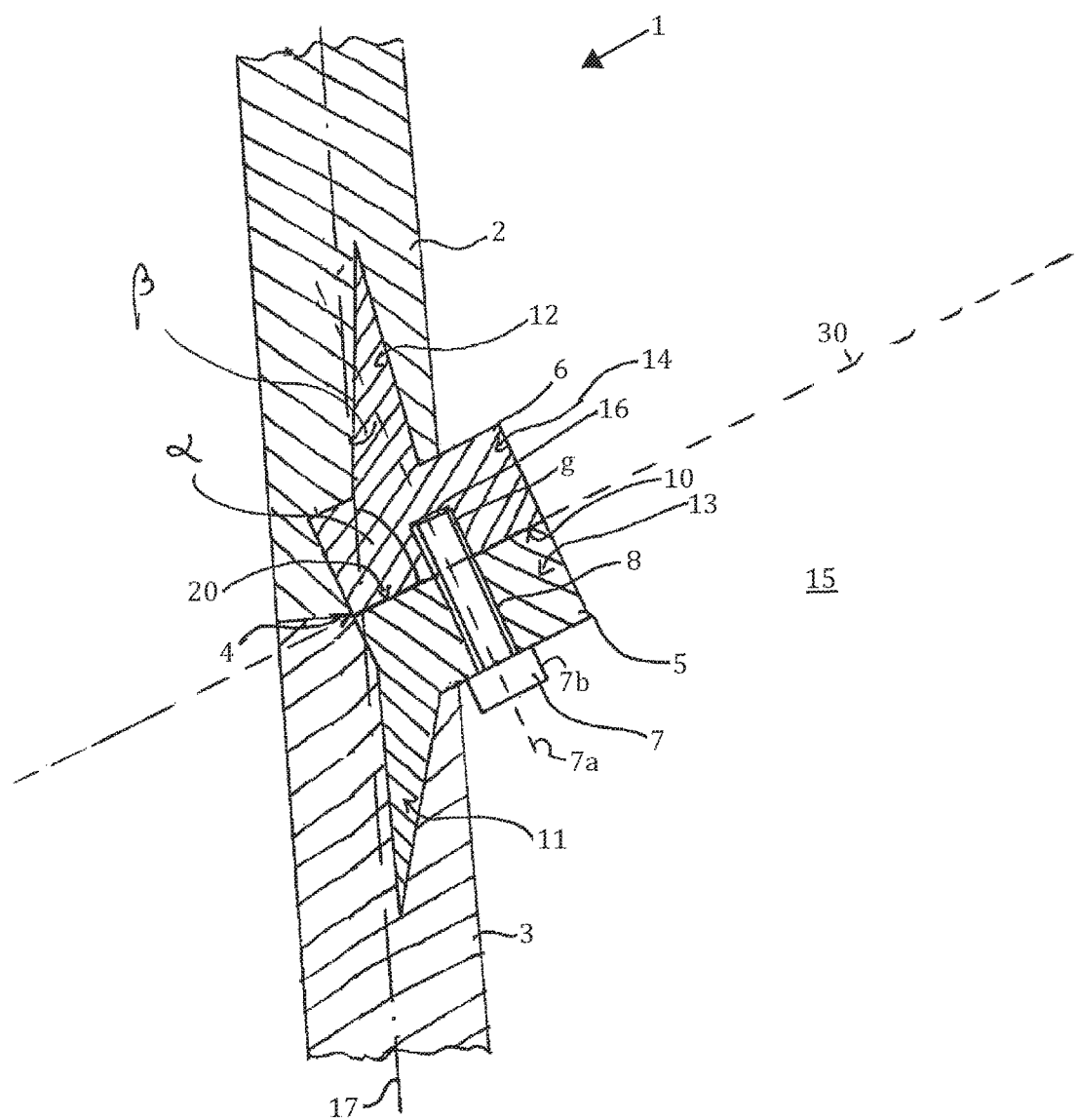
FIG. 2 shows a schematic, sectional view of a rotor blade in a connecting region.

Shown schematically in FIG. 2, in a sectional view, is a detail of a connecting region of a rotor blade 1. The figure shows a rotor-blade outer portion 2 and a rotor-blade inner portion 3, which are connected to each other via a connecting device 4. The connecting device 4 has an inner insert 5 and an outer insert 6. The outer insert 6 and the inner insert 5 are connected to each other by a screw 7, as an exemplary embodiment of a connecting element. The screw 7 is led through a through-hole 8 in the inner insert 5 and screwed to an internal thread 9 in a blind hole 16 in the outer insert 6. The inner insert 5 has a first or inner contact face 10, and the outer insert 6 has a second or outer contact face 20. The contact faces 10, 20 in this case bear flatly on each other, and form a plane 30. This plane 20 is at an angle $\alpha$ ($\alpha > 20°$ and $< 90°$, e.g., 30° to 80° or 30° to 50°) in relation to the rotor-blade longitudinal axis 17.

The inner insert 5 has a wrap portion 11 and a connecting inner portion 13. The wrap portion 11 of the inner insert 5 in this case is wrapped in the rotor-blade inner portion 3. The through-hole 8, with the screw 7, is provided in the connecting inner portion 13. The through-hole 8 in this case leads from an interior space 15 of the rotor blade as far as the inner contact face 10. Correspondingly, the outer insert 6 has a connecting outer portion 14, which is connected to a lamination portion 12. The lamination portion 12 is incorporated in the rotor-blade outer portion 2, in particular laminated-in. The connecting outer portion 14 of the fastening element 6 has a blind hole 16 that has an internal thread 9. The blind hole 16 begins at the outer contact face 20 of the outer insert 6 and ends in the connecting outer portion 14. The screw 7 is screwed into the internal thread 9, i.e., the screw 7 is accordingly fastened in the connecting outer portion 14 of the outer insert 6. By means of the screw 7, the inner insert 3 and the outer insert 6, and consequently the rotor-blade outer portion 2, are connected to the rotor-blade inner portion 3. The screw 7 in this case faces into the interior space 15 of the rotor blade 1. Consequently, the screw 7 is freely accessible, and can be replaced in the case of damage or within a service interval.

The screw 7 has a longitudinal axis 7a that is perpendicular to the plane 30, and that is at an angle $\beta$ in relation to the rotor-blade longitudinal axis 17. The free end 7b of the screw 7 projects by this angle out of the rotor blade 1. In this case, the screw head 7b faces into an inside of the interior space 15 of the rotor blade 1. This enables the screw 7 to be serviced, or replaced, from the interior space 15 of the rotor blade 1. This additionally has the advantage that the screws 7 are protected by external influences within the interior space 15 of the rotor blade 1. Selection of the angles $\alpha$ and $\beta$ determines how the screw head 7a projects into the interior space.

The lamination portion 12 of the outer insert 6 and the wrap portion 11 of the inner insert 5 are each realized as an elongate partial body, which tapers. The wrap portion 11 and the lamination portion 12 in this case are disposed, substantially along a rotor-blade longitudinal axis 17 of the rotor blade 1, in the inner insert 5 and outer insert 6, respectively. Owing to this arrangement, the load occurring at the connecting region is transferred virtually without deflection, i.e., in a arrangement that is almost parallel to the rotor-blade longitudinal axis 17.

Since the lamination portions 12, 11 are arranged substantially parallel to the rotor-blade longitudinal axis 17, the inner contact face and the outer contact face, which span a plane 30, are arranged at an angle $\alpha$ in relation to the two lamination portions 11, 12. The angle $\alpha$ in this case is less than 90°.

The connecting inner portion 13 and the connecting outer portion 14 are each realized in the shape of a ring. In an alternative embodiment, namely, if a plurality of inner and outer inserts are distributed over the circumference of the blade inner portion and blade outer portion, respectively, the connecting inner portion and the connecting outer portion are realized, in particular, in the shape of a cylinder. The connecting inner portion 13 and the connecting outer portion 14, and the wrap portion 11 and lamination portion 12, respectively, are realized as a single piece, and together constitute the inner insert 5 and outer insert 6, respectively.

The invention claimed is:

1. A wind turbine rotor blade, comprising:
    a rotor-blade longitudinal axis,
    at least one rotor-blade inner portion having a region configured to be connected to the rotor-blade hub,
    at least one rotor-blade outer portion having a rotor-blade tip,
    the rotor-blade inner portion and the rotor-blade outer portion each being made substantially of a fibre-reinforced plastic, and
    an inner space inside the rotor-blade inner portion and the rotor-blade outer portion,
    the rotor-blade inner portion and the rotor-blade outer portion being connected to each other by at least one connecting device, the at least one connecting device comprising:
        an inner insert that is at least partially wrapped in the fibre-reinforced plastic of the rotor-blade inner portion and has an inner contact face, and
        an outer insert that is at least partially incorporated in the fibre-reinforced plastic of the rotor-blade outer portion and has an outer contact face,
    the inner insert and the outer insert being connected to each other by the inner and the outer contact faces and at least one connecting element, and
    the inner contact face and the outer contact face being arranged parallel in relation to each other and forming a plane that is at an oblique angle relative to the rotor-blade longitudinal axis, wherein the at least one connecting element comprises a first end that is inserted at least partly in the inner insert and the outer insert, the at least one connecting element comprising a second end that extends into the inner space.

2. The wind turbine rotor blade according to claim 1, wherein the outer insert is at least partially laminated into the fibre-reinforced plastic of the rotor-blade outer portion.

3. The wind turbine rotor blade according to claim 1, wherein the at least one connecting element extends through a through-hole provided in the inner insert and is fastened in a blind hole provided in the outer insert.

4. The wind turbine rotor blade according to claim 3, further comprising an expansion sleeve arranged between the through-hole and the connecting element.

5. The wind turbine rotor blade according to claim 1, wherein at least one of the inner insert and the outer insert is made from a metal material.

6. The wind turbine rotor blade according to claim 1, wherein the inner insert has a wrap portion that is completely wrapped in the rotor-blade inner portion, and a connecting inner portion that, together with the wrap portion, constitutes the inner insert.

7. The wind turbine rotor blade according to claim 6, wherein a first interior space is provided inside the rotor-blade inner portion, and the connecting inner portion is arranged, at least partially, in the first interior space.

8. A rotor blade according to claim 1, wherein the outer insert has a lamination portion that is completely laminated into the rotor-blade outer portion, and a connecting outer portion that, together with the lamination portion, constitutes the outer insert.

9. A wind turbine, comprising:
at least one rotor blade according to claim 1.

10. A connecting device for connecting a rotor-blade inner portion to a rotor-blade outer portion of a wind-turbine rotor blade, the connecting device comprising:
an outer insert that is to be at least partially laminated into the rotor-blade outer portion and that has a lamination portion and an outer contact face,
an inner insert that is to be at least partially wrapped in the rotor-blade inner portion and that has a lamination portion and an inner contact face, and
at least one connecting element that extends through the inner insert and that is to be fastened in the outer insert, the outer and the inner contact faces forming a plane when connecting the rotor-blade inner portion to the rotor-blade outer portion, wherein the plane is at an oblique angle relative to a longitudinal axis of the wind-turbine rotor blade, wherein the at least one connecting element comprises a first end that is inserted, at least partly, in the inner insert and the outer insert and a second end that extends into the inner space.

11. A method comprising:
connecting a rotor-blade inner portion to a rotor-blade outer portion of a rotor blade of a wind turbine, wherein connecting comprises:
providing an outer insert, an inner insert and at least one connecting element,
at least partially laminating the outer insert into the rotor-blade outer portion,
at least partially wrapping the inner insert in the rotor-blade inner portion, and
connecting the rotor-blade inner portion to the rotor-blade outer portion by inserting the at least one connecting element in the outer insert, via the inner insert, and fastening the at least one connecting element in the outer insert,
wherein the at least one connecting element comprises a first end that is inserted, at least partly, in the inner insert and the outer insert and a second end that extends into the inner space,
wherein an inner contact face of the inner insert and an outer contact face of the outer insert are arranged parallel in relation to each other and form a plane that is at an oblique angle relative to a longitudinal axis of the rotor-blade of the wind turbine.

* * * * *